United States Patent [19]

Hiraoka et al.

[11] Patent Number: 5,574,107
[45] Date of Patent: Nov. 12, 1996

[54] SOLID GOLF BALL

[75] Inventors: Hidenori Hiraoka; Yoshimasa Koizumi, both of Kobe, Japan

[73] Assignee: Sumitomo Rubber Industries, Ltd., Kobe, Japan

[21] Appl. No.: 389,690

[22] Filed: Feb. 16, 1995

Related U.S. Application Data

[60] Continuation of Ser. No. 121,529, Sep. 16, 1993, abandoned, which is a division of Ser. No. 53,235, Apr. 28, 1993, abandoned.

[30]  Foreign Application Priority Data

Apr. 28, 1992 [JP] Japan ................................ 4-135772

[51] Int. Cl.$^6$ ...................................................... A63B 37/02
[52] U.S. Cl. .................... 525/193; 524/2; 524/5; 473/372; 473/378
[58] Field of Search ........................... 525/193; 524/1–5; 273/218, 228

[56]  References Cited

U.S. PATENT DOCUMENTS 2,259,349  8/1937  Merrill ...................... 273/62
4,561,657  12/1985  Tominaga et al. ............ 273/218

*Primary Examiner*—Joseph L. Schofer
*Assistant Examiner*—Patrick R. Delaney
*Attorney, Agent, or Firm*—Birch, Stewart, Kolasch & Birch, LLP

[57]  ABSTRACT

The present invention provides a one-piece solid golf ball or a two or more piece solid golf ball which comprises an inner core and a cover covering the inner core. The one-piece solid golf ball is formed from a rubber composition which comprises:

a base rubber,
  vulcanized rubber powder, and
  a vulcanizing agent.

The two or more piece solid golf ball comprises an inner core and a cover covering the inner core, the inner core being composed of either one uniform rubber material or a combination of a center and one or more outer layers disposed over the center, wherein one or more rubber portions of the inner core are formed from a rubber composition comprising:

a base rubber,
  vulcanized rubber powder, and
  a vulcanizing agent.

4 Claims, No Drawings

SOLID GOLF BALL

This application is a continuation of application Ser. No. 08/121,529 filed on Sep. 16, 1993, abandoned, which is a divisional of Ser. No. 08/053,235, filed on Apr. 28, 1993, abandoned.

BACKGROUND OF THE INVENTION

1. Field of the Invention

The present invention relates to a one-piece solid golf ball or a two or more piece solid golf ball which comprises an inner core and a cover covering the inner core.

2. Description of the Related Art

There are one-piece solid golf balls and two or more piece solid golf balls golf balls commercially available. The one-piece solid golf balls are formed by molding and vulcanizing a rubber composition. The two or more piece solid golf balls are composed of an inner core and a cover covering the inner core. The inner core is composed of either one uniform rubber material or a combination of a center and one or more outer layers disposed over the center. At least one portion of the inner core is formed by molding and vulcanizing the rubber composition. The rubber composition for the solid golf balls generally comprises polybutadiene rubber having at least 40% of cis-1,4 structure as a base rubber, metal salt of $\alpha,\beta$-ethylenically unsaturated carboxylic acid (e.g. methacrylic acid, acrylic acid, etc.) as a co-crosslinking agent and a vulcanizing agent (e.g. organic peroxides).

The one-piece solid golf balls are mainly used at driving ranges. The most important performance for the golf ball used at driving ranges is high durability (i.e. the golf balls must be hard to break).

However, the conventionally used one-piece solid golf balls do not have sufficient durability, and it is therefore strongly desired to enhance the durability.

The two or more piece solid golf balls are generally used for high quality golf balls. It is further required to improve the hit feeling of the balls. It is considered that the poor hit feeling occurs due to the difference in hardness between the cover and the inner core. In order to improve the hit feeling of these golf balls, it has been proposed to make an inner core having a surface portion that is harder than its center portion. The larger the hardness difference between the surface and center of the inner core, the better the hit feeling. However, as this difference in hardness becomes larger, the durability of the ball is liable to become inferior. Sometimes, the golf ball will break after being hit with a golf club (e.g. No.1 to No. 3 wood clubs, etc.) 10 to 15 times.

SUMMARY OF THE INVENTION

Under these circumstances, the present inventors have intensively studied. As a result, it has been found that, when vulcanized rubber powder is formulated into a rubber composition for the golf balls, durability can be improved without deterioration of hit feeling, and the present invention has been completed.

The main object of the present invention is to provide a golf ball having both excellent durability and hit feeling.

This object, as well as other objects and advantages of the present invention are obtained by providing a one-piece solid golf ball formed from a rubber composition which comprises:

a base rubber, vulcanized rubber powder, and a vulcanizing agent.

The objects and advantages of the present invention are also achieved by providing a two or more piece solid golf ball comprising an inner core and a cover covering the inner core, the inner core being composed of either one uniform rubber material or a combination of a center and one or more outer layers disposed over the center, wherein one or more rubber portions of the inner core are formed from a rubber composition comprising:

a base rubber, vulcanized rubber powder, and a vulcanizing agent.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE INVENTION

In the present invention, the reason why formulating the vulcanized rubber powder improves durability is not clear at present. Without wishing to be bound by any theory, it is now considered that the vulcanized rubber powder improves the dispersibility of the rubber composition and inhibits the runaway reaction based on the metal salt of $\alpha,\beta$-ethylenically unsaturated carboxylic acid when vulcanizing.

The base rubber used in the present invention can be a rubber generally used for golf balls, for example natural rubber, butadiene rubber, isoprene rubber and a mixture thereof. Preferred is butadiene rubber having at least 40% cis-1,4 structure.

The vulcanizing agent formulated into the rubber composition of the present invention is one that is generally used for golf balls, including organic peroxides, such as dicumyl peroxide, benzoyl peroxide and the like. Preferred is dicumyl peroxide.

The rubber composition for the golf balls may further contain a co-crosslinking agent, a filler or other additives. The co-crosslinking agent may be a metal salt of an $\alpha,\beta$-ethylenically unsaturated carboxylic acid. Examples of the $\alpha,\beta$-ethylenically unsaturated carboxylic acid are acrylic acid and methacrylic acid. The metal atoms used for forming the metal salt are not limited, but generally are divalent metal atoms, such as zinc, manganese, calcium and the like. The metal salts of $\alpha,\beta$-ethylenically unsaturated carboxylic acid may be prepared in the rubber composition by separately formulating thereto a metal oxide (e.g. zinc oxide, manganese oxide etc.) and an $\alpha,\beta$-ethylenically unsaturated carboxylic acid. The fillers are those generally used for golf balls, for example zinc oxide, barium sulfate and the like. The additives are those generally used for golf balls, for example an antioxidant (e.g. 2,5-di-t-butylhydroquinone) and a vulcanization conditioner.

An important feature of the present invention, is that a vulcanized rubber powder is formulated into the rubber composition for the golf balls.

Regarding rubber physical properties (before pulverizing) of the vulcanized rubber powder, the hardness is preferably 40 to 95, particularly 55 to 80. If the hardness is outside the above range, the resulting ball has poor durability. The hardness is measured using a hardness tester (JIS-C type). The impact resilience is preferably not less than 50% particularly not less than 60% and the tensile strength is preferably not less than 70 kg/cm$^2$, particularly not less than 100 kg/cm$^2$.

Where the vulcanized rubber powder is not formulated, the resulting rubber preferably has a hardness of 50 to 90. If the vulcanized rubber powder is formulated, the resulting rubber preferably has a hardness of 50 to 90. If the hardness of the rubber, whether the rubber powder is formulated or not is more than 90, then the resulting golf ball has a poor hit feeling. If the hardness is less than 50, then the golf ball has poor durability.

The vulcanized rubber powder may be formed from either reclaimed rubber (particularly, waste rubber from the golf ball of a one-layer golf ball, or the inner core) or rubber which is newly vulcanized and then pulverizing.

It is preferred that the rubber component of the vulcanized rubber powder is butadiene rubber having a cis-1,4 bond of at least 40%. The total rubber component may be constituted with the polybutadiene rubber, or other rubbers (e.g. natural rubber, styrene-butadiene rubber, isoprene rubber, chloroprene rubber, butyl rubber, ethylene propylene rubber, acrylonitrile rubber, etc.) may be blended in the above polybutadiene rubber in an amount of not more than 45 part by weight, based on 100 parts by weight of the rubber component.

Where the vulcanized rubber powder is made from newly produced vulcanized rubber, the vulcanizing agent to be used is one that is normally used, for example, organic peroxide (e.g. dicumyl peroxide, 1,1-bis(t-butylperoxy)-3,3,5-trimethylcyclohexane etc.), sulfur, N,N'-phenylenebismaleimide, and the like. The vulcanizing agent may be contained in an amount of 0.1 to 6 parts by weight, preferably 0.5 to 3 parts by weight, based on 100 parts by weight of the rubber component. The rubber composition of the vulcanized rubber powder may contain a co-crosslinking agent, such as products obtained by reacting an $\alpha,\beta$-ethylenically unsaturated carboxylic acid with a metal oxide (e.g. zinc oxide, etc.) in the rubber composition, powdered metal salts (e.g. normal salt, basic salt, etc.) of an $\alpha,\beta$-ethylenically unsaturated carboxylic acid, polyfunctional monomers and the like. Particularly, metal salts more (particularly, a zinc salt) of an $\alpha,\beta$-ethylenically unsaturated carboxylic acid are preferred.

In order to adjust the specific gravity and improve the strength of the vulcanized rubber powder, one or more sorts of inorganic fillers (e.g. barium sulfate, calcium carbonate, etc.) may be formulated. Further, softening agents and liquid rubbers may also be formulated in order to control the hardness of the vulcanized rubber powder. Antioxidants may also be appropriately formulated in order to improve resistance to aging.

The rubber composition thus obtained is then subjected to press vulcanization at 140° to 200° C. for 8 to 60 minutes, preferably 150° to 175° C. for 10 to 40 minutes, or subjected to radiation crosslinking due to $\gamma$ ray to make a vulcanized rubber which is then pulverized to obtain the vulcanized rubber powder.

The shape of the vulcanized rubber before pulverizing is not specifically limited, but it may have a size and shape suitable for processing by a normal pulverizer. The size of the particles of the vulcanized rubber powder after pulverizing is not specifically limited, but it is preferably not more than 1000 μm. The lower limit of the particle size of the vulcanized rubber powder is not limited and it may be as small as 0.1 μm.

Any method may be used to pulverize the vulcanized rubber. Preferably, the vulcanized rubber is formed into tips of about 1 to 3 mm at normal temperatures. The tips are then frozen (e.g, cooled using liquid nitrogen, dry ice, etc.) and pulverized to obtain an extremely fine vulcanized rubber powder, whereby, dispersibility during kneading is improved.

The vulcanized rubber powder thus obtained is formulated in the rubber composition for making the golf ball of the present invention, which is kneaded with a roll, a kneader, a Banbury mixer, etc. Then, the resulting blend is charged in a die and vulcanized to form a one-piece solid golf ball, or an inner core of a two or more piece solid golf ball. With a two or more piece solid golf ball, the inner core is covered with a cover which is mainly composed of an ionomer resin.

The amount of the vulcanized rubber powder is preferably 1 to 35 parts by weight, particularly 5 to 20 parts by weight, based on 100 parts by weight of the base rubber. When the amount of the vulcanized rubber powder is smaller than the above range, the durability improving effect is insufficient. On the other hand, when the amount is larger than the above range, the workability during mixing is inferior.

The vulcanized rubber powder may be formulated together with other materials when preparing the rubber composition for making the golf ball, and then kneaded to form a rubber composition containing the vulcanized rubber powder. Or, the rubber composition for the golf ball is preliminarily prepared, and then the vulcanized rubber powder is formulated thereto. The former method is normally used.

The rubber composition wherein the vulcanized rubber powder has been formulated may be vulcanized under the same conditions as in the prior art. For example, vulcanization may be conducted at 140° to 200° C. for 8 to 40 minutes, preferably 150° to 180° C. for 10 to 25 minutes.

EXAMPLES

The following Examples and Comparative Examples further illustrate the present invention in detail but are not to be construed to limit the scope thereof.

Examples 1 to 3 and Comparative Example 1

In order to obtain a vulcanized rubber powder used for preparing golf balls of the Examples, a rubber composition shown in Table 1 was first prepared.

TABLE 1

| Component | Amount (parts by weight) |
|---|---|
| Polybutadiene rubber*$^1$ | 100 |
| Zinc oxide | 22 |
| Methacrylic acid | 20 |
| Antioxidant*$^2$ | 0.2 |
| Calcium carbonate | 5 |
| Vulcanization agent$^3$ | 1.6 |

*$^1$: BR11 (trade name) manufactured by Nippon Gosei Gomu Co.
*$^2$: 2,5-Di-t-butylhydroquinone, NOCRAK NS-7 (trade name) manufactured by Ohuchi Shinko Kagaku Kogyo Co.
*$^3$: Dicumyl peroxide, PERCUMYL D (trade name) manufactured by Nippon Yushi Co.

The above rubber components were kneaded by a 10 liter kneader and then sheeted by an open roll. They were then press-vulcanized at 165° C. for 18 minutes to make a vulcanized rubber sheet. Physical properties of the resulting vulcanized rubber are shown in Table 2.

TABLE 2

| Physical properties | Measured value |
|---|---|
| Hardness (JIS-C)*4 | 70 |
| Impact resilience (%)*5 | 74 |
| Tensile strength (kgf/cm$^2$)*6 | 150 |

*4: Measured by a hardness tester (JIS-K 6301 C type)
*5: Measured by Dunlop Tripsometer at normal temperature.
*6: Measured by a method for measurement of tensile strength according to JIS-K 6301.3

Then, the above vulcanized rubber sheet was pulverized roughly into tips of 1 to 3 mm by a pulverizer and cooled, and then pulverized into powders having a particle size of not more than 800 μm.

The resulting vulcanized rubber powder was formulated with the rubber components shown in Table 3 to prepare a rubber composition. This was then charged into a mold and vulcanized at 165° C. for 20 minutes to make a one-piece solid golf ball having an outer diameter of 42.7 mm. The polybutadiene rubber, antioxidant and vulcanization initiator used were the same as those shown in Table 1. Physical properties of the resulting golf ball are shown in Table 4.

TABLE 3

| | Example 1 | Example 2 | Example 3 | Comparative Example 1 |
|---|---|---|---|---|
| Polybutadiene rubber | 100 | 100 | 100 | 100 |
| Zinc oxide | 23 | 23 | 23 | 23 |
| Methacrylic acid | 20 | 20 | 20 | 20 |
| Antioxidant | 0.5 | 0.5 | 0.5 | 0.5 |
| Vulcanizing agent | 1.5 | 1.5 | 1.5 | 1.5 |
| Vulcanized rubber powder | 10 | 20 | 30 | 0 |

Unit: parts by weight

TABLE 4

| | Example 1 | Example 2 | Example 3 | Comparative Example 1 |
|---|---|---|---|---|
| Weight (g) | 45.6 | 45.7 | 45.8 | 45.5 |
| Compression (PGA)*7 | 92 | 93 | 93 | 92 |
| Impact resilience*8 | 1.000 | 1.003 | 1.002 | 1.000 |
| Hardness (JIS-C) Center-Surface*9 | 63–76 | 60–76.5 | 60–76.5 | 67–75.5 |
| Durability*10 | 155 | 144 | 141 | 100 |

*7: The requisite force for a constant strain is measured by a measuring apparatus manufactured by ATT1 Engineering Co. The larger the value, the harder the ball.
*8: Measured at an initial velocity of 45 m/second using an air gun which is the same kind as that used for measuring initial velocity at R & A. The number is expressed as an index when the number of Comparative Example 1 is made 1.000. The larger the value, the better the flying performances.
*9: Measured by a hardness tester (JIS-K 6301, C type). The first number indicates the hardness of the center, and the second number indicates the hardness of the surface of a golf ball.
*10: A golf ball is allowed to bump against a metal plate at a speed of 45 m/second, repeatedly, using an air gun. The number of times at which the ball was broken was determined. The number is expressed as an index when the number of Comparative Example 1 is made 100. The larger the value, the better durability of the ball.

As is apparent from Tables 3 and 4, the golf balls of Examples 1 to 3. wherein the vulcanized rubber powder was formulated, showed excellent durability in comparison with the golf ball of Comparative Example 1, wherein no vulcanized rubber powder was formulated.

Regarding impact resilience, which is one of the evaluation criteria for flying performances, the golf balls of Examples 1 to 3 have a value which is the same as, or superior to that of the golf ball of Comparative Example 1. Regarding a hitting test by 10 testers, including some professional golfers, the golf balls of Examples 1 to 3 were evaluated as having excellent hit feeling in comparison with the golf ball of Comparative Example 1. No deterioration of flight performances and hit feeling due to the addition of the vulcanized rubber powder were observed.

Examples 4 to 6 and Comparative Example 2

A rubber composition wherein the same vulcanized rubber powder as that used in Examples 1 to 3 was formulated in an amount shown in Table 5 was prepared. The resulting rubber composition was charged in a mold and vulcanized at 160° C. for 25 minutes to make an inner core having an outer diameter of 38.5 mm. Then, a cover was formed by covering the inner core with a mixture containing 100 parts by weight of ionomer resin and 2 parts by weight of titanium oxide to make a two-piece solid golf ball having a diameter of 42.7 mm.

The same materials as those of Table 3 were used. The ionomer resin used for forming the cover is a mixture of HI-MILAN 1706 and HI-MILAN 1605 manufactured by Mitsui Du Pont Polychemical Co. (weight ratio: 50/50).

TABLE 5

| | Example 4 | Example 5 | Example 6 | Comparative Example 2 |
|---|---|---|---|---|
| Polybutadiene rubber | 100 | 100 | 100 | 100 |
| Zinc oxide | 20 | 20 | 20 | 20 |
| Zinc acrylate | 30 | 30 | 30 | 30 |
| Antioxidant | 3 | 3 | 3 | 3 |
| Vulcanizing agent | 4 | 4 | 4 | 4 |
| Vulcanized rubber powder | 5 | 10 | 20 | 0 |

Unit: parts by weight

The physical properties of the resulting two-piece solid golf balls are shown in Table 6. Regarding impact resilience, the number is expressed as an index when the number of the golf ball of Comparative Example 2 is made 1.000. Regarding durability, the number is expressed as an index when the golf ball of Comparative Example 2 is made 100. Regarding the hardness, the hardness of the center and surface of the inner core is shown, respectively.

TABLE 6

| | Example 4 | Example 5 | Example 6 | Comparative Example 2 |
|---|---|---|---|---|
| Weight (g) | 45.1 | 45.0 | 45.0 | 45.1 |
| Compression | 88 | 88 | 89 | 87 |
| Impact resilience | 1.000 | 1.002 | 1.002 | 1.000 |
| Hardness (JIS-C) Center-Surface | 59–82 | 61–82 | 62.5–83 | 67–80 |
| Durability | 111 | 123 | 114 | 100 |

As is apparent from Tables 5 and 6, the golf balls of Examples 4 to 6, wherein the vulcanized rubber powder was formulated, showed excellent durability in comparison with the golf ball of Comparative Example 2, wherein no vulcanized rubber powder was formulated.

Regarding impact resilience, which is one of the evaluation criteria, the golf balls of Examples 4 to 6 have a value which is the same as, or superior to, that of the golf ball of Comparative Example 2. Regarding a hitting test by 10 testers, including some professional golfers, the golf balls of Examples 4 to 6 were evaluated as having excellent hit feeling in comparison with the golf ball of Comparative Example 2. No deterioration of flying performances and hit feeling due to the addition of the vulcanized rubber powder were observed.

As is described above, according to the present invention, a golf ball having excellent durability can be provided by formulating a vulcanized rubber powder in the golf ball of one-layer structure or the inner core of the golf ball of at least two-layer structure comprising the outer layer and inner core of at least one layer.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A two or more piece solid golf ball comprising an inner core and a cover covering said inner core, said inner core comprising either a single piece of one uniform rubber material, or a combination of a center and one or more outer layers disposed over the center, wherein said inner core, or one or more portions thereof is formed from a rubber composition comprising (a) 100 parts by weight of a butadiene rubber having at least 40% of cis-1,4-construction as a base rubber,
   (b) 1 to 35 parts by weight of vulcanized rubber powder,
   (c) 5 to 50 parts by weight of a metal salt of an $\alpha,\beta$-ethylenically unsaturated carboxylic acid as a co-crosslinking agent,
   (d) 0.1 to 6 parts by weight of an organic peroxide as a vulcanizing agent, and
   (e) a filler wherein said vulcanized rubber powder has a particle size of 0.1 to 1,000 µm and is prepared by pulverizing a vulcanized rubber having a JIS-C hardness of 40 to 95.

2. The two or more piece solid golf ball according to claim 1 wherein said vulcanized rubber powder is formed from a vulcanized rubber having a hardness of 40 to 95 (JIS-C hardness tester), an impact resilience of 50% or more and a tensile strength of 70 Kg/cm$^2$ or more.

3. The two or more piece solid golf ball according to claim 1 wherein said vulcanizing agent is dicumyl peroxide.

4. The two or more piece solid golf ball according to claim 1 wherein said co-crosslinking agent is zinc (meth)acrylate.

* * * * *